United States Patent [19]
Rodrigues

[11] 3,803,386
[45] Apr. 9, 1974

[54] AQUARIUM HEATER

[75] Inventor: John J. Rodrigues, Orinda, Calif.

[73] Assignee: Kerdon Corporation, Hayward, Calif.

[22] Filed: Oct. 13, 1972

[21] Appl. No.: 297,214

[52] U.S. Cl................ 219/523, 47/44, 119/5, 219/316, 219/322, 219/528, 219/381, 219/437, 219/544, 240/10, 338/22 R, 338/212
[51] Int. Cl.............................................. H05b 3/06
[58] Field of Search.......... 219/316, 322, 523, 52 B, 219/437, 381, 544; 119/5; D91/2; 240/10; 338/22 R, 23, 212; 47/44

[56] References Cited
UNITED STATES PATENTS

| | | | |
|---|---|---|---|
| 1,569,102 | 1/1926 | Warner | 219/523 |
| 2,511,902 | 6/1950 | Cabrera | 219/523 |
| 2,613,311 | 10/1952 | Goff | 338/212 X |
| 2,726,316 | 12/1955 | Visser et al. | 219/544 X |
| 2,805,313 | 9/1957 | Lumb, Jr. | 119/5 X |
| 2,905,918 | 9/1959 | Wagner, Jr. | 219/528 X |
| 3,250,895 | 5/1966 | McNair | 219/523 X |
| 3,269,174 | 8/1966 | Linville | 338/23 X |
| 3,292,579 | 12/1966 | Buchanan | 119/5 |
| 3,562,952 | 2/1971 | Bramante | 47/44 |
| 2,016,123 | 10/1935 | Schorr | 119/5 |
| 2,566,921 | 9/1951 | Briscoe | 219/523 |
| 2,566,990 | 9/1951 | Mahle | 219/316 |
| 2,699,488 | 1/1955 | Arak et al. | 219/322 X |
| 2,888,547 | 5/1959 | Saper | 219/523 |
| 3,059,091 | 10/1962 | Wenzel | 119/5 |
| 3,326,183 | 6/1967 | Buchanan | 119/5 |
| 3,371,533 | 3/1969 | Dumas | 338/22 R X |
| 3,547,725 | 12/1970 | Shomphe et al. | 219/528 X |
| 3,557,344 | 1/1971 | DeCrosta | 219/316 |
| 3,609,343 | 9/1971 | Howlett | 240/10 |

FOREIGN PATENTS OR APPLICATIONS

| | | | |
|---|---|---|---|
| 1,267,479 | 6/1961 | France | 119/5 |
| 1,175,727 | 11/1958 | France | 119/5 |
| 1,158,192 | 11/1963 | Germany | 219/523 |

*Primary Examiner*—Volodymyr Y. Mayewsky

[57] ABSTRACT

A heater for an aquarium involves a heater component comprising a resistance element of the printed circuit type sandwiched in between its substrate and an upper layer of similar material with flexible leads extending therefrom, the resulting assembly being then dipped in a solution which dries to form a water proof, flexible, protective skin or covering, and capable of maintaining flexibility, particularly in the leads, whereby, the heater component, aside from conventional use of heater components to warm the water in aquariums, can now be formed or shaped to simulate scenic components, such as rocks, logs and particularly scenic components which can move in responsive to water currents, such as leaves and the like. When so formed to simulate scenic components in an aquarium, the heater component loses its identity as such, and to the observer, becomes really a component part of the scenery. A thermistor, when employed in the heater system, may also be embedded in with the resistance element, as may also, a fusible link in series with the resistance, to protect against overload.

The heater control is readily mountable on an aquarium tank wall and includes an illuminated temperature scale for accurately indicating water temperature.

10 Claims, 5 Drawing Figures

PATENTED APR 9 1974 3,803,386

AQUARIUM HEATER

My invention relates primarily to aquarium equipment and more particularly to heating means for maintaining proper water temperature in an aquarium.

Among the objects of my invention are;

1. To provide a novel and improved heater for an aquarium or the like;
2. To provide a novel and improved aquarium heater which will not detract from the general interior surroundings of an aquarium, as viewed by an observer;
3. To provide a novel and improved aquarium heater which will enhance the interior view of an aquarium as observed from without;
4. To provide a novel and improved aquarium heater which will add to the scenic effect within an aquarium;
5. To provide a novel and improved method of fabricating an aquarium heater;
6. To provide an aquarium heater with novel and improved visual control of temperature, and
7. To provide a novel and improved aquarium heater operable at low voltage.

Additional objects of my invention will be brought out in the following description of a preferred embodiment of the same, taken in conjunction with the accompanying drawings wherein.

Figure 1:
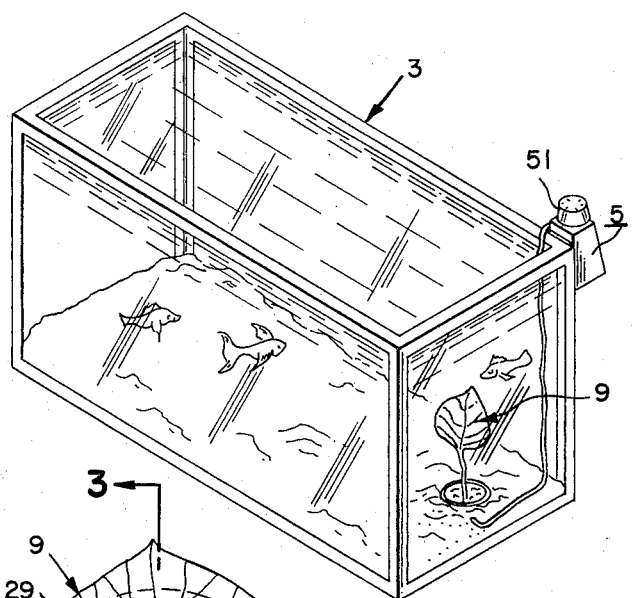
FIG. 1 is a perspective view depicting a preferred form of the invention as installed in an aquarium.
Figure 4:
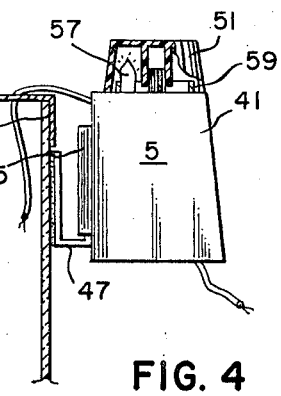
FIG. 4 is a view in elevation of the controller involved in the present invention.
Figure 2:
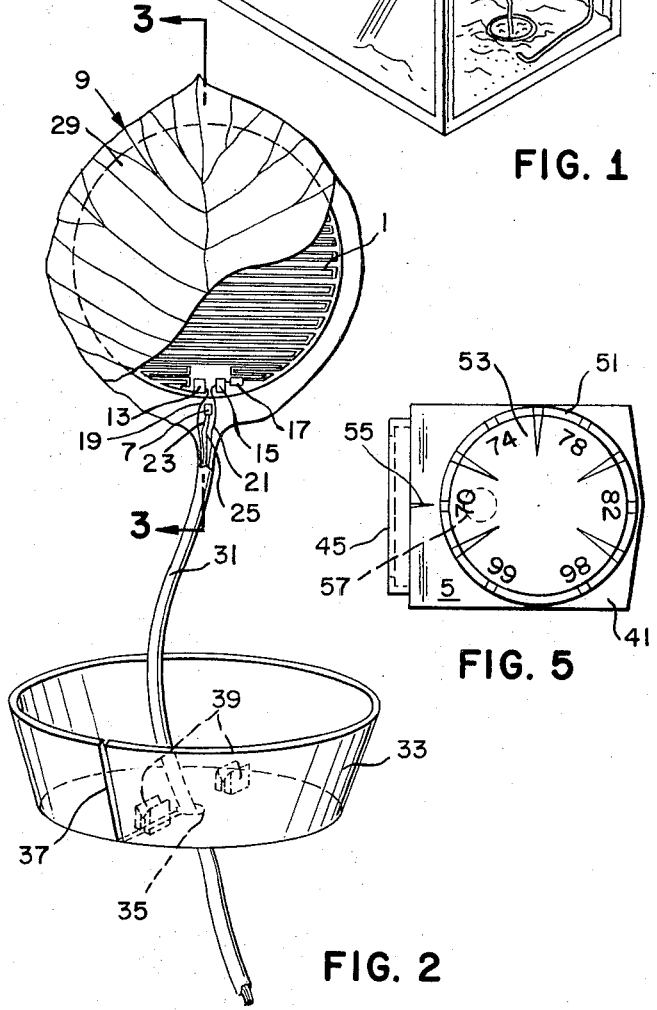
FIG. 2 is a side view, partially mutilated to expose internal structure of the heater element.
Figure 5:
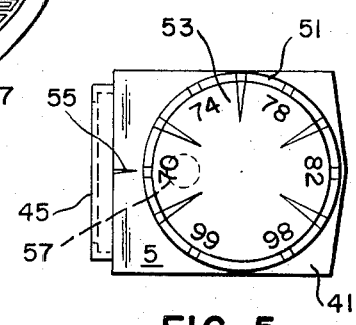
FIG. 5 is a plan view of the controller of FIG. 4.
Figure 3:
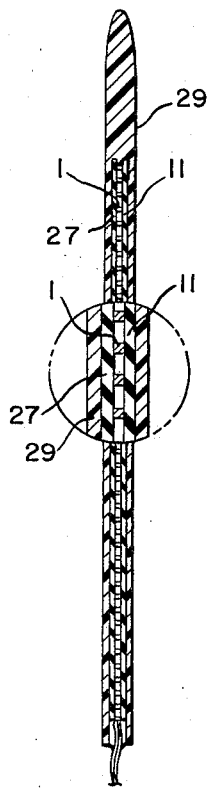
FIG. 3 is a view in section taken in the plane 3—3 of FIG. 2.

Referring to the drawings for details of my invention in its preferred form, the heater makes use of a resistance element 1 controlled externally of an aquarium 3 by a solid state controller 5 mounted on the aquarium, and which, in turn, responds to a thermistor 7 submerged in the water.

The principle features of the invention relate to a heater component 9 which includes the resistance element 1, and the method of fabricating the same, along with some features included in the controller; the use of solid state circuitry and a thermistor in an aquarium heater system being broadly old.

In the fabrication of the heater component 9, the resistance element 1 is first prepared on a substrate 11 such as a thin film of silicone rubber, along with a pair of thin flat terminals 13, 15, by any known and appropriate printed circuit or chemical etching process, suitable space preferably being left between one terminal and the approximate end of the resistance element for the connection between them, of an appropriate fusible link 17 or equivalent thermal switch.

Leads 19, 21, preferably of insulated, fine, flexible wire are soldered or otherwise connected to the terminals.

The thermistor 7 of miniature size, with suitable flexible insulated leads 23, 25 extending therefrom, is preferably positioned on the substrate between the terminals, following which, a covering layer 27 of material, similar to the substrate and of roughly the same size and shape, is adhesively or otherwise bonded to the substrate and components thereon, to securely sandwich and bond the components such as the resistance, fusible link and thermistor, between the two layers.

Upon completion of this sandwiching operation, the resulting assembly, along with the protruding leads, is then dipped into a silicone rubber solution and dried to form a continuous water impenetrable skin or coating 29 over the entire surface to protect the entire heater component against penetration of water, and particularly at the point of entrance of the leads, which would otherwise be particularly vulnerable.

The skin or coating, being itself quite soft and flexible, its presence will not noticeably impair the initial flexible character of the leads, nor will it adversely affect the flexibility of the heater component to which the leads connect.

This is important to the present invention in that, aside from conventional types of heater component installations such as the heater hanging on a tank wall, or buried under the sand, the present invention permits of the use of the heater component in various forms and shapes to simulate scenic components often employed in aquariums, such as rock formations, logs . . . . etc., and more particularly, components capable of some movement in response to water currents, such as plant life in the form of leaves . . . . etc., and when so camouflaged, the heater component will to all appearances, lose its identity as such, and for all intents and purposes, it is a component part of the scenery.

In the drawings, the invention has been depicted in the form of a leaf, which when blended in with other leaves and scenic components, will form part of the scenic background in the tank, and no one, uninformed of its true function, would be aware of the fact that it was anything but part of the scenery.

While in its preferred form, the invention has been illustrated in terms of a scenic component of the scenery within the aquarium, the heater component may be in the form of a pancake of any particular shape, which may be installed submerged beneath the sand in the aquarium, or which may be secured adhesively or mechanically applied to a wall of the tank, or as a backing for some component within the tank.

When in the form of a leaf or other growth emerging from the sand, it will have a stem 31. The same may then be anchored into position by a shallow flexible cup 33 of plastic or rubber, having a bottom opening 35 which will provide a snug slidable fit about the stem, the cup being provided with a radial split 37 enabling the cup to be twisted for application about the stem of the heater component.

After application to the stem, the cup will be buried in the sand leaving the heater component and preferably sufficient of the stem exposed above the sand to permit movement in response to water currents, to simulate the normal movements of a growing plant in its natural habitat.

The snug slidable fit of the cup about the stem, permits of adjustment of the height of the heater component above the surface of the sand to provide the best scenic effect.

With the heater leaf thus installed, additional leaves or plant life with conventional anchoring means may be grouped about the heater leaf in appropriate arrangement, and other scenic effects may be added, the diameter of the cup 33 being preferably such as to receive a plurality of conventional anchoring means.

Oppositely disposed plastic clips 39 molded with the cup, and preferably equally spaced from the center, may be used to assist in holding and/or stabilizing a heater when so anchored.

The controller 5 involves a closed upper end housing to house the necessary printed circuits, which, as previously indicated, may be conventional. On its mounting wall is a shallow loop 45 for mounting purposes, as it enables the controller to be slipped over a flat or shallow hook 47 affixed to a wall of the aquarium tank by means such as a pressure sensitive adhesive backing 49.

Located on the top wall of the controller housing is a hollow translucent truncated control knob 51, mounted on a vertical control shaft extending through the roof of the housing. On the top of the knob is a suitable temperature scale 53 with division lines extending down the sloping surface of the knob to its lower edge. A notch 55 on the upper surface of the controller housing, extends to the lower edge of the knob and serves as an indicator of temperature to which the controller may be adjusted.

Within the hollow knob, in the region closest to the radial notch, is a small light 57, adequate to illuminate the scale and thus facilitate readings.

Another feature of the controller is the provision of a circular barrier rib 59 extending upwardly from the upper end or roof of the housing, within the base area of said knob, between the knob wall and the light 57, and preferably concentric with the knob wall. Any water accidentally spilled on the controller will thereby be precluded from gaining access to the circuitry within the housing.

Thus the invention not only does away with the unsightly appearance of many of the aquarium heaters presently available on the market, but can be made to enhance the scenic beauty within the tank, besides adding other features as described.

From the foregoing description of my invention in its preferred form, it will be apparent that the same fulfills all the objects attributable to the invention, and while the same is subject to alteration and modification without departing from the underlying principles involved, I do not desire to be limited in my protection on the specific details illustrated and described except as may be necessitated by the prior art.

For example, the circuitry of the heater can be designed for low voltage, and through the use of a step-down transformer, such heater can then be run off the conventional household power lines. When thus designed for operation on low voltage, the heater can then be operated with utmost safety to the individual and the life in the acquarium.

Also, the controller may be provided with a wall plug to enable its use with aquarium heater components of various types.

I claim:

1. A flexible scenic heater adaptable for use in an aquarium, comprising a substrate of electrical insulation material on which is a resistance element of the printed circuit type, leads in circuit with said resistance element and of a length to extend outside an aquarium when said resistance element is installed within the aquarium, a covering layer of electrical insulation material covering said resistance element and forming a sandwich, and a coating of electrical insulation material enclosing said sandwich and said leads and forming a continuous and uninterrupted covering over said resistance element, said leads and the connection between them, with said continuous and uninterrupted covering enclosing said leads for a distance sufficient to extend outside an aquarium when said resistance is installed within such aquarium.

2. A heater in accordance with claim 1, characterized by a thermistor included in said sandwich and having leads extending alongside said first leads and enclosed by said coating for a distance corresponding substantially to that distance along which said first leads are enclosed.

3. A heater in accordance with claim 2, characterized by a fusible element included in said sandwich in series with said resistance element.

4. A heater for an aquarium comprising a heater component in the form of a scenic component of electrical insulating material and including a stem of flexible electrical insulating material, means for anchoring said scenic component by its stem in the sand of an aquarium, a resistance heater element enclosed within said scenic component and electrically insulated thereby, and electrical leads extending from said resistance heater element within said stem and electrically insulated thereby, said stem with said electrical leads being capable of supporting said scenic component under water and having sufficient flexibility to enable swaying of said scenic component heater when installed in an aquarium, the length of said stem and insulated electrical leads being such as to extend at least to a location approaching a wall of such aquarium at an elevation above water level therein for connection to external circuitry.

5. A heater for an aquarium in accordance with claim 4, characterized by said resistance heater element being embedded into said scenic component, and means for varying current flow through said resistance heater element to cover a range of desirable water temperatures.

6. A heater for an aquarium in accordance with claim 4, characterized by a temperature sensing unit enclosed with said resistance heater element within said scenic component for detecting a drop in water temperature below a predetermined value.

7. A heater for an aquarium in accordance with claim 6, characterized by a fusable link in circuit with said resistance heater element and adapted to fuse at a temperature above said temperature range, said fusable link being also enclosed within said scenic component.

8. A heater for an aquarium in accordance with claim 7, characterized by means in circuit with said heater component for controlling temperature developing current to said heater component, said controlling means including a housing enclosing circuitry connected to said heater component, a control knob on said housing for adjusting current to said heater component, means including said control knob for indicating a temperature adjustment, said control knob being of a translucent material and a light source within said knob for illuminating said indicating means.

9. A heater for an aquarium in accordance with claim 4, characterized by said scenic component being in the form of a leaf, and said resistance heater element being of the printed circuit type.

10. A heater in accordance with claim 4, characterized by said means for anchoring said scenic component by its stem in the sand of an aquarium as including a shallow flexible cup having a bottom opening for passage of said stem, said cup having a substantially radial split to said bottom opening for installation of said cup about said stem.

* * * * *